(12) United States Patent
Zhou et al.

(10) Patent No.: US 12,010,596 B2
(45) Date of Patent: Jun. 11, 2024

(54) CONTROL DEVICE CONFIGURED FOR AND METHOD OF DETERMINING A DATA FORMAT

(71) Applicant: HUAWEI TECHNOLOGIES CO., LTD., Shenzhen (CN)

(72) Inventors: Chan Zhou, Munich (DE); Panagiotis Spapis, Munich (DE); Ke Zhang, Chengdu (CN); Fan Wu, Chengdu (CN); Supeng Leng, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 16/906,678

(22) Filed: Jun. 19, 2020

(65) Prior Publication Data
US 2020/0322763 A1    Oct. 8, 2020

Related U.S. Application Data (63) Continuation of application No. PCT/EP2017/084180, filed on Dec. 21, 2017.

(51) Int. Cl.
*H04W 4/40* (2018.01)
*H04L 1/00* (2006.01)
(Continued)

(52) U.S. Cl.
CPC ............ *H04W 4/40* (2018.02); *H04L 1/003* (2013.01); *H04W 28/0215* (2013.01); *H04W 92/18* (2013.01)

(58) Field of Classification Search
None
See application file for complete search history.

(56) References Cited

U.S. PATENT DOCUMENTS 9,286,740 B2 *   3/2016   Kamps ................. G07C 5/0858
2012/0105637 A1   5/2012   Yousefi et al.
(Continued)

FOREIGN PATENT DOCUMENTS

CN   101808393 A   8/2010
CN   103401522 A   11/2013
(Continued)

OTHER PUBLICATIONS

Xiao Yao et al: A novel task allocation for maximizing reliability considering fault-tolerant in VANET real time systems, 2017 IEEE 28th Annual International Symposium on Personal, Indoor, and Mobile Radio Communications(PIMRC), IEEE, Oct. 8, 2017 (Oct. 8, 2017), pp. 1-7,XP033321406, total 8 pages.
(Continued)

*Primary Examiner* — Mariela Vidal Carpio
(74) *Attorney, Agent, or Firm* — HAUPTMAN HAM, LLP (57) ABSTRACT

A control device configured for determining a data format for data to be sent via a V2X communication link between a vehicle and at least one device, wherein the control device is configured for receiving information regarding communication capacity and computation capacity of the vehicle and/or of the at least one device, the control device is configured for analyzing the received information based on the communication capacities and the computation capacities, the control device is configured for selecting, based on the analysis, a data format from a set of data formats for the V2X communication link, wherein the data formats of the set are differentiated with regard to the data volume of the data to be sent, and the control device is configured for sending to the vehicle and/or the at least one device an indication of the data format to be used for the data to be sent.

19 Claims, 4 Drawing Sheets

(51) Int. Cl.
*H04W 28/02* (2009.01)
*H04W 92/18* (2009.01)

(56) References Cited

U.S. PATENT DOCUMENTS

| | | | |
|---|---|---|---|
| 2014/0258505 A1 | 9/2014 | Liao et al. | |
| 2016/0174122 A1* | 6/2016 | Sorrentino | H04W 36/22 |
| | | | 370/331 |
| 2017/0288806 A1* | 10/2017 | Blasco Serrano | H04W 4/029 |
| 2018/0124177 A1* | 5/2018 | Perlick | H04L 12/2856 |
| 2018/0139794 A1* | 5/2018 | Chae | H04W 40/24 |
| 2018/0241502 A1* | 8/2018 | Beale | H04W 28/0226 |
| 2018/0247067 A1* | 8/2018 | Hrabak | G06F 21/6218 |
| 2018/0261095 A1* | 9/2018 | Qiu | G05D 1/0022 |
| 2019/0173818 A1* | 6/2019 | Friedman | H04L 51/063 |
| 2019/0306678 A1* | 10/2019 | Byun | H04W 88/04 |
| 2020/0228988 A1* | 7/2020 | Yang | H04L 63/1466 |
| 2020/0294401 A1* | 9/2020 | Kerecsen | G05D 1/0287 |
| 2021/0021976 A1* | 1/2021 | Kim | H04W 76/10 |
| 2021/0083736 A1* | 3/2021 | Chae | H04B 7/0671 |

FOREIGN PATENT DOCUMENTS

| | | |
|---|---|---|
| CN | 103491522 A | 1/2014 |
| WO | 2017011039 A1 | 1/2017 |

OTHER PUBLICATIONS

Hou X, Li Y, Chen M, et al, "Vehicular Fog Computing: A Viewpoint of Vehicles as the Infrastructures", Published in: IEEE Transactions on Vehicular Technology (vol. 65 , Issue: 6 , Jun. 2016), total 14 pages.
Xiao Yu et al:"Vehicular fog computing: Vision and challenges", 2017 IEEE International Conference on Pervasive Computing and Communications Workshops(Percom Workshops), IEEE, Mar. 13, 2017 (Mar. 13, 2017), pp. 6-9, XP033092243, total 4 pages.
Chen X, Wang L., "Exploring Fog Computing-Based Adaptive Vehicular Data Scheduling Policies Through a Compositional Formal Method PEPA", Published in: IEEE Communications Letters ( vol. 21 , Issue: 4 , Apr. 2017 ), total 4 pages.
5G-PPP-White-Paper-on-Automotive-Vertical-Sectors, Oct. 2015, total 67 pages.
International Search Report issued in corresponding International Application No. PCT/EP2017/084180, dated Mar. 23, 2018, European Patent Office, Rijswijk, Netherlands.
Chinese Search Report issued in corresponding Chinese Application No. 201780097720.6, dated Dec. 21, 2020, pp. 1-4.
Chinese Office Action issued in corresponding Chinese Application No. 201780097720.6, dated Dec. 30, 2020, bages 1-6.

* cited by examiner

CONTROL DEVICE CONFIGURED FOR AND METHOD OF DETERMINING A DATA FORMAT

CROSS-REFERENCE TO RELATED APPLICATIONS

This application is a continuation of International Application No. PCT/EP2017/084180, filed on Dec. 21, 2017. the disclosure of which is hereby incorporated by reference in its entirety.

TECHNICAL FIELD

The present invention relates to a control device configured for determining a data format, a vehicle configured for sending data, a device configured for sending data, a system configured for determining a data format, a method of determining a data format and a computer program. In particular, the present invention relates to coordination of processing tasks among the UE/vehicles to implement collaborative processing of large data volumes.

BACKGROUND

Typical vehicular communication use cases require the sharing of information among the vehicles so as to proceed in proper decisions. However, the sharing of information among the vehicles will lead to increased delays due to limited radio resources. In uncoordinated Vehicular to Everything (known as V2X) applications, where the vehicles transmit to their neighbors without the coordination of the network, collisions may occur which further increase the delays.

One potential way to deal with the increased volume of data to be transmitted is the processing of the information before being shared between the vehicles. This may take place in cloud servers or locally. The first case increases the delay due to the need for transmission of the information from the UE/vehicle to the network and vice-versa plus the propagation delay required to reach the cloud server. The second option assumes that the UE/vehicle will have the processing capabilities to process the information before the transmission, which may not be possible for all the vehicles in certain vicinity. A combination of the first and the second option is a vehicle based implementation of the so-called Fog computing, where the devices are sharing the processing load among them according to their capabilities and the network conditions like e.g. load.

There have been several studies on Fog-computing for the V2X applications. Hou X, Li Y, Chen M, et al. Vehicular Fog Computing: A Viewpoint of Vehicles as the Infrastructures, IEEE Transactions on Vehicular Technology, 2016, 65(6): 3860-3873 describes the benefits of Fog computing in vehicular communications by identifying relationship among the communication capability, connectivity, and mobility of vehicles but it is not specified how the system considers the computational capabilities of each vehicle.

In Chen X, Wang L. Exploring Fog Computing Based Adaptive Vehicular Data Scheduling Policies through a Compositional Formal Method—PEPA, IEEE Communications Letters, 2017, PP(99):1-1., fog computing technologies are applied for enhancing a vehicular network in a layered network architecture where the processing tasks are scheduled dynamically to the devices considering the network topology but without considering the network load; also the way that the devices configuration takes place is not described.

US 2012/0105637 A1 discloses a method enabling a vehicle to connect to a cloud server facilitating the vehicles to access multimedia applications. The method focuses only in multimedia services and only in facilitating vehicles to connect to cloud server for sharing information.

SUMMARY

In view of the above-mentioned problems and disadvantages, the present invention aims to improve data transmission in V2X communication. The present invention has thereby the object to provide a control device configured for determining a data format and a method of determining a data format, which operate with better performance compared to the corresponding solutions known in the art.

The object of the present invention is achieved by the solution provided in the enclosed independent claims. Advantageous implementations of the present invention are further defined in the dependent claims.

In particular, the present invention proposes collaborative processing of a large data volume based on V2X and fog computing. This invention relates to coordinating the processing tasks among vehicles in certain vicinity.

A first aspect of the present invention provides a control device configured for determining a data format for data to be sent via a V2X communication link between a vehicle and at least one device, wherein the control device is configured for receiving information regarding communication capacity and computation capacity of the vehicle and/or of the at least one device, the control device is configured for analyzing the received information based on the communication capacities and the computation capacities, the control device is configured for selecting, based on the analysis, a data format from a set of data formats for the V2X communication link, wherein the data formats of the set are differentiated with regard to the data volume of the data to be sent, and the control device is configured for sending to the vehicle and/or the at least one device an indication of the data format to be used for the data to be sent.

This present invention propose the introduction of a Communication Computing Control Function (CCCF) for deciding which format is to be used by each vehicle/device according to both its communication and computation capabilities and for communicating this decision to the vehicle/device. Such decision may include sending more than one indication for example when a vehicle or its user equipment (UE) should communicate utilizing a finishing format for one service and a raw format for another service. All vehicles provide their own vehicular status (vehicular self-description parameters), computing power, communication capacity information to the CCCF. This may happen either on demand, periodically, or every time a significant change happens in the network elements/topology/etc.

The present invention provides a solution to adaptive selection of a transmission data type according to the capacity of vehicles. This achieves an improved end performance by efficient use of communication and computational capabilities. The cooperation between vehicles with various computing and communication capabilities is formed so as to support a mixture of vehicles from various generations and/or computational capabilities.

The present invention provides a solution to support safety-related V2X services like environment perception, sensor data sharing and/or dynamic map update; providing traffic information and environment perception information in real time (pre-processing before transmission); reducing the radio resource requirements at the expense of computing in vehicles; and shorten the perception-reaction time of vehicles due to the sharing of the computational load among vehicles, RSUs and/or MEC (Mobile Edge Computing).

The present invention further provides a solution to support non-safety V2X services like vehicular Internet and infotainment, e.g. web browsing, social media, app download; mobile business services with seamless wide-area coverage, e.g. mobile cloud office, e-mail, online conference; and augmented reality (AR)/virtual reality (VR).

The present invention has the advantage of analyzing at least the most time-sensitive data at the network edge, close to where it is generated instead of sending vast amounts of data like e.g. IoT (Internet Of Things) data to the cloud. Accordingly, on IoT data may be acted in milliseconds, based on defined policies, while selected data may be sent to the cloud for historical analysis and longer-term storage.

In an implementation form of the first aspect, the control device is configured for sending a message including the indication of the data format and an assignment of computing tasks to be performed on data before sending the data, or a message including the indication of the data format, an assignment of computing tasks and a receiver, to the vehicle and/or the at least one device. Additionally to an indication of the data format, an assignment of computing tasks to be performed on data before sending the data may be sent. Such computing task or computing tasks may convert the source data or raw data to data in another format with reduced volume. Further, one or more receivers of the message may be included so that data formats and/or tasks can be sent directly to a respective receiver.

In a further implementation form of the first aspect, the control device is configured for providing at least three data formats, comprising at least one of a raw data format for sending uncomputed raw data, a roughing data format for sending moderately computed rough data, and a finishing data format for sending extensively computed finished data. More than these three data format may be provided, for example, five data formats. Further, different levels of data formats may be provided. For example, more than one roughing format levels may be provided with slightly or heavily processed data. The finishing format may be data which may not be processed more.

In an implementation form of the first aspect, the information regarding communication capacity includes the communication capacities of the vehicle and/or the device and the communication capacity of the V2X communication link. Such implementation considers the actual status and a more precise collaborative processing.

In a further implementation form of the first aspect, the information regarding computation capacity includes a current computing capacity, actual computing tasks and/or a static computing capacity. Such implementation considers the actual status and a more precise collaborative processing.

In an implementation form of the first aspect, the control device is configured for receiving and analyzing further information such as static vehicle information, dynamic vehicle information, static device information, dynamic device information, source data description and/or a use case related to the data. For example, in certain use cases like emergency braking processed data may be required regardless the availability of high link capacity. Such further information can refine the analysis and the result of the analysis, i.e. the data format and/or the assignment of computing tasks.

In a further implementation form of the first aspect, the control device is configured for indirectly receiving the information regarding communication capacity and computation capacity of the vehicle and/or of the at least one device from a representative of the vehicle and/or of the at least one device. Such a representative of the vehicle and/or of the at least one device may for example be a leader or a header of platoon.

In an implementation form of the first aspect, the control device is configured for being implemented in a vehicle, a device, an element of a V2X communication network providing the V2X communication link and/or a service provider. The control device may for example be implemented in a base station or an RSU (Road Side Unit). The control device or control function can be implemented in any unit or element as long as it can communicate directly or indirectly with the vehicle and/or of the at least one device. The control device may be distributed over more than one entities. The control device may be implemented in any logically centralized network element. This said, the control device can be collocated with base stations, on control plane network functions such mobility servers, etc. Additionally, it may be implemented in cloud server applications, edge computing servers, etc. Finally it may be implemented in cluster/group head of vehicle clusters/groups.

A second aspect of the present invention provides a vehicle configured for sending data via a V2X communication link between the vehicle and at least one device according to a received data format, wherein the vehicle is configured for sending information regarding communication capacity and computation capacity of the vehicle, the vehicle is configured for receiving an indication of the data format to be used for the data to be sent to the at least one device, and the vehicle is configured for sending the data according to the received data format. The same advantages and modifications as described above apply.

In an implementation form of the second aspect, the vehicle is configured for computing the data prior to sending the data. This can be achieved by compression techniques, filter operations and the like.

A third aspect of the present invention provides a device configured for sending data via a V2X communication link between the device and at least one vehicle according to a received data format, wherein the device is configured for sending information regarding communication capacity and computation capacity of the device, the device is configured for receiving an indication of the data format to be used for the data to be sent to the at least one vehicle, and the device is configured for sending the data according to the received data format. The same advantages and modifications as described above apply.

In an implementation form of the third aspect, the device is configured for computing the data prior to sending the data. By computing the data the data volume to be sent can be reduced. This can be achieved by compression techniques, filter operations and the like.

A fourth aspect of the present invention provides a system configured for determining a data format for data to be sent via a V2X communication link between a vehicle and at least one device, wherein the system includes a control device as described above, at least one vehicle as described above and/or at least one device as described above. The same advantages and modifications as described above apply.

A fifth aspect of the present invention provides a method of determining a data format for data to be sent via a V2X communication link between a vehicle and at least one device, comprising receiving information regarding communication capacity and computation capacity of the vehicle and/or of the at least one device, analyzing the received information based on the communication capacities and the computation capacities, selecting, based on the analysis, a data format from a set of data formats for the V2X communication link, wherein the data formats of the set are differentiated with regard to data volume, and sending to the vehicle and/or the at least one device an indication of the data format to be used for the data to be sent. The same advantages and modifications as described above apply.

A sixth aspect of the present invention provides a computer program with a program code for performing the method as described above when the computer program runs on a computer or the control device as described above. The same advantages and modifications as described above apply.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Figure 1:
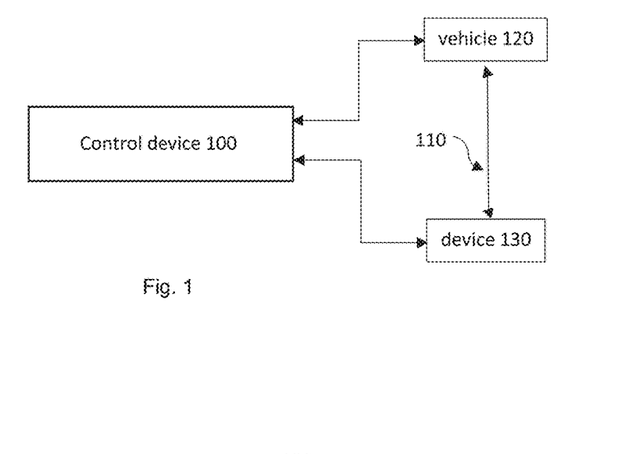
FIG. 1 shows an example of a control device configured for determining a data format for data to be sent via a V2X communication link.

FIG. 1 shows a control device 100 configured to determine a data format for data to be sent via a V2X communication link 110 between a vehicle 120 and at least one device 130. The control device 100 receives information regarding communication capacity and computation capacity of the vehicle 120 and/or of the at least one device 130. The control device 100 analyzes the received information based on the communication capacities and the computation capacities. The control device 100 selects, based on the analysis, a data format from a set of data formats for the V2X communication link 110, wherein the data formats of the set are differentiated with regard to the data volume of the data to be sent. The control device 100 sends to the vehicle 120 and/or the at least one device 130 an indication of the data format to be used for the data to be sent. The device 130 may be a vehicle, an RSU or any other of similar type device.

FIG. 1 illustrates specifically a closed-loop control flow. In particular, the CCCF or control device 100 may collect the vehicular description parameters, including but not limited to the speed, position, braking, acceleration, etc. The information may also contain the type of information to be transmitted, i.e. sensor information, camera inputs, etc. and further source data description, e.g. type of source, information to be send, as well as the computation and communication capacity of each vehicle 120. Additionally, the CCCF 100 may collect similar information from other network elements in the vicinity such as Road Side Units (RSUs) that may offer computational capabilities for the processing of the available data.

The information exchanged in the fog computing-based V2X communication may further include control information like the transmission data format and computing tasks. The control device 100 may send such control information to the other elements or subscribers. With regard to communication between vehicles 120 and devices 130 it is noted that each of such elements include a User Equipment UE or the like for communication. The control device 100 may also include a UE. Alternatively, the control device 100 may communicate via another link or protocol like for example a CAN bus with the UE of its host.

The control device 100 particularly functions as a control unit for determining the mode of collaboration and for the release of control information. It functions further as a storage unit for storing the static information e.g. vehicle information.

When the CCCF or control device 100 receives the aforementioned information elements, it will analyze it for extracting the proper computational effort distribution. Such computational effort distribution includes data formats and with it the data volume of the data to be sent.

The categories of data transmitted in vehicular networks are divided into data formats. In this example, three data formats are provided. Subformats or additional format types of the data formats are possible.

A raw data format contains the original unprocessed information, e.g. the raw images or videos without compression).

A roughing data format contains lightly processed data, e.g. extracted relevant parts of information from captured images, a blurred object with rough size and position or the like.

A finishing data format contains highly processed data, including some accurate information extracted from the raw data, such as the objects size, speed and position, and warning information.

The data from the RSU/vehicle is divided into the raw, the roughing and the finishing format or data. The CCCF or control device 100 can select the type of to be transferred data for each vehicle according to its own computation capacity and the communication capacity and/or the considered use case.

The roughing data, being more flexible, can be compressed by the vehicle itself first, then is transmitted to others. The finishing format data needs the vehicle first to compute or compress all data completely, then transmit it to others. Accordingly, the features of finishing data include a small data volume and its suitability for important content related to traffic safety.

According to the processing and communication capabilities of the vehicles and the link capacities, the control device 100 may decide that the network elements should transmit to their neighboring vehicles using one of the proposed exemplary data formats. Of course, the control device 100 may decide for one network element to use using one of the proposed exemplary data formats for transmission to a first neighbor and another data format for transmission to another neighbor.

The algorithm operating in the control device 100 may follow the forthcoming principles. The raw format data may be sent to nearby vehicles directly. This data format will be adopted by the vehicle with poor computing capability. The roughing format will be adopted by the vehicle with moderate computing capability. As for the finishing format, the vehicle can process all data before transmission. It will be adopted by the vehicle with high computing capability. This process will relieve the load burden on the vehicular networks. Additional computing power in Mobile Edge Computing (MEC) or RSU can be considered to offload the processing tasks.

In FIG. 1 a first embodiment of the control device 100 is shown. Further embodiments reflecting more detailed and optional implementations of the first embodiment as depicted in FIG. 1 are shown in the following Figures.

Figure 2:
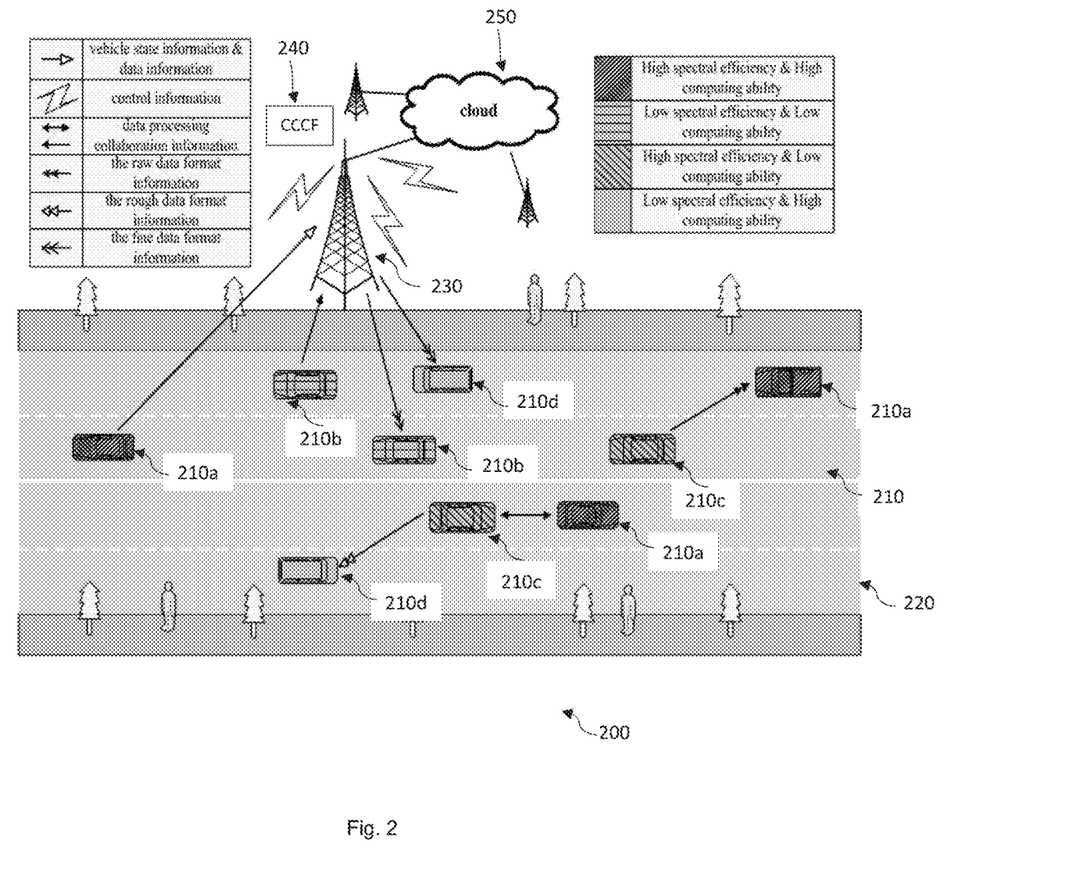
FIG. 2 shows an example of a V2X communication architecture.

FIG. 2 shows an example of a V2X communication architecture and of a system 200 configured for determining a data format for data to be sent via a V2X communication link.

Vehicles 210 like automobiles, trucks, motorcycles, busses and the like driving on a road 220 and devices like for example an RSU (Road Side Unit) 230 are part of the system. Further, at least one Communication Computing Control Function CCCF 240 is included in the system 200.

The system 200 is connected to a cloud 250 so that vehicles 210 or devices 230 can utilize cloud resources like for example computing power. The system 200 may further include and/or is connected to a V2X communication network and/or a radio network like for example a mobile communication network.

All vehicles 210 and/or the RSU 230 provide their own vehicular status like vehicular self-description parameters, their computing power and their communication capacity information to the CCCF 240. The CCCF 240 plans the resource use based on the aggregated information from vehicles 210 and/or the RSU 230 and sends the task assignment to these vehicles 210 and/or the RSU 230. According to the task arrangement, whether the raw data to be processed can be handled by the vehicle itself, the RSU 230 and other vehicles cooperate or not.

The CCCF 240 analyses the vehicles 210 and/or the RSU 230 at least based on the respective communication capacities and computation capacities. Such communication capacities or spatial efficiency are an indicator for the communication abilities of a vehicle or a device. It may be measured by bandwidth or throughput parameters. The computation capacities or computing ability are an indicator for the calculation abilities of a vehicle or a device. It may be measured by computing parameters like for example number and speed of processing cores or the like. The communication capacities and computation capacities are dynamic values, which may change depending for example on the location of the vehicle, the load of the radio network, the load of the onboard computer etc.

In the example of FIG. 2 four different groups of vehicles 210 are present. First vehicles 210a have high communication capacities and high computation capacities. Second vehicles 210b have low communication capacities and low computation capacities. Third vehicles 210c have high communication capacities and low computation capacities. Lastly, fourth vehicles 210d have low communication capacities and high computation capacities.

According to these different communication capacities and computation capacities, the CCCF 240 provides the vehicles 210 and/or the at least one device 230 with different indications of the data format to be used for the data to be sent to other subscribers like vehicles 210 and devices 230. Further, the CCCF 240 may send an assignment of computing tasks to be performed on data before sending the data to vehicles 210 and devices 230.

In the following, some examples of the communication between the vehicles 210 are given. For example, a vehicle 210c having high communication capacities and low computation capacities sends data in the raw data format to a vehicle 210a because of its high communication capacities and high computation capacities. A further vehicle 210c collaborates with another vehicle 210a and sends data in the rough data format to a vehicle 210d having low communication capacities and high computation capacities. A vehicle 210b having low communication capacities and low computation capacities sends data into the cloud 250 and/or to the RSU 230 for processing. The computed or processed data is sent from the RSU 230 I the fine or finishing data format to the neighboring vehicles 210b and 210d.

Figure 3:
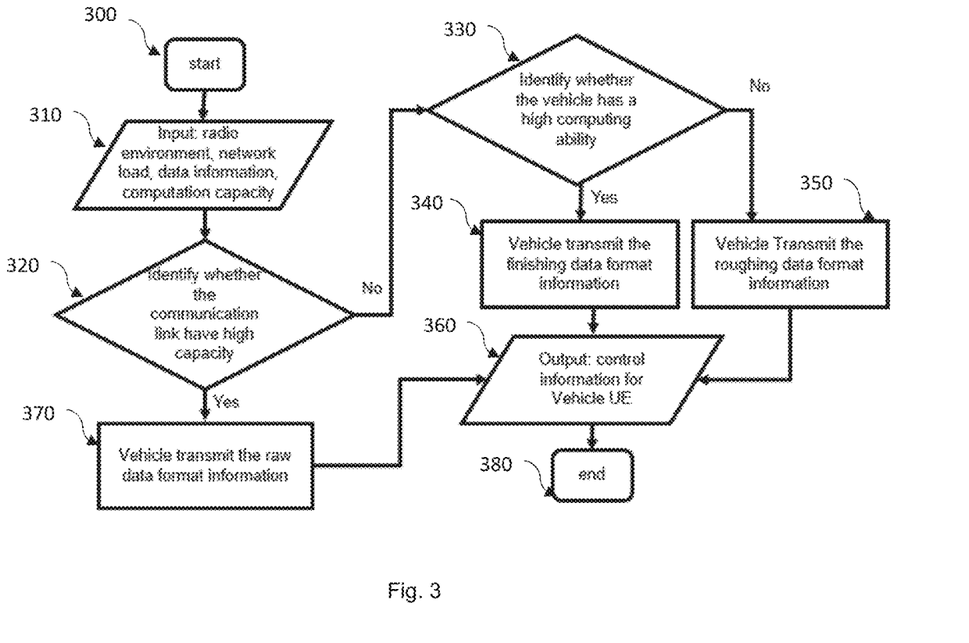
FIG. 3 shows a flowchart of an exemplary implementation of a control algorithm for determining the data format for data to be sent.

FIG. 3 shows a flowchart of an exemplary implementation of a control algorithm for determining the data format for data to be sent.

At step 300 the algorithm starts, which may include setting up communication elements or sensors and the like. At step 310 information regarding communication capacity and computation capacity is received. This information can be received or be demanded from the at least vehicle and/or of the at least one device. Further information may originate from a radio network, the V2X network or the like and may include information on the radio environment and network load. Even further information may include information on the data or use cases for which the data is needed and/or during which the data was created.

At step 320, it is identified whether the V2X communication link has a high communication capacity. Here, static information may be used indicating the theoretical bandwidth of the V2X communication link. However, dynamic information indicating the actual bandwidth of the V2X communication link may provide information that is more precise.

For a V2X communication link having no high communication capacity, the algorithm branches to step 330. In step 330, it is identified whether the vehicle has a high computation capacity. The expression vehicle means the vehicle from which the data is to be sent.

In case the vehicle has a high computation capacity, the algorithm branches to step 340. In step 340, the finishing data format is chosen to be used for sending data by the vehicle. In case the vehicle has no high computation capacity, the algorithm branches to step 350. In step 350, the roughing data format is chosen to be used for sending data by the vehicle.

At step 360, a control information or an indication of the data format to be used is outputted to the vehicle or the UE of the vehicle.

If in step 320 is decided that the V2X communication link has high communication capacity, the algorithm branches to step 370. In step 370, the raw data format is chosen to be used for sending data by the vehicle. After running step 370, step 360 is executed as described above. The control algorithm ends in step 380 and may start again for the next data transmission or the next communication for the same data to another vehicle and/or device.

This algorithm may also consider inputs such as the use case. Depending on the use case, maybe even in case of high link capacity it is not required to send raw data.

Figure 4:
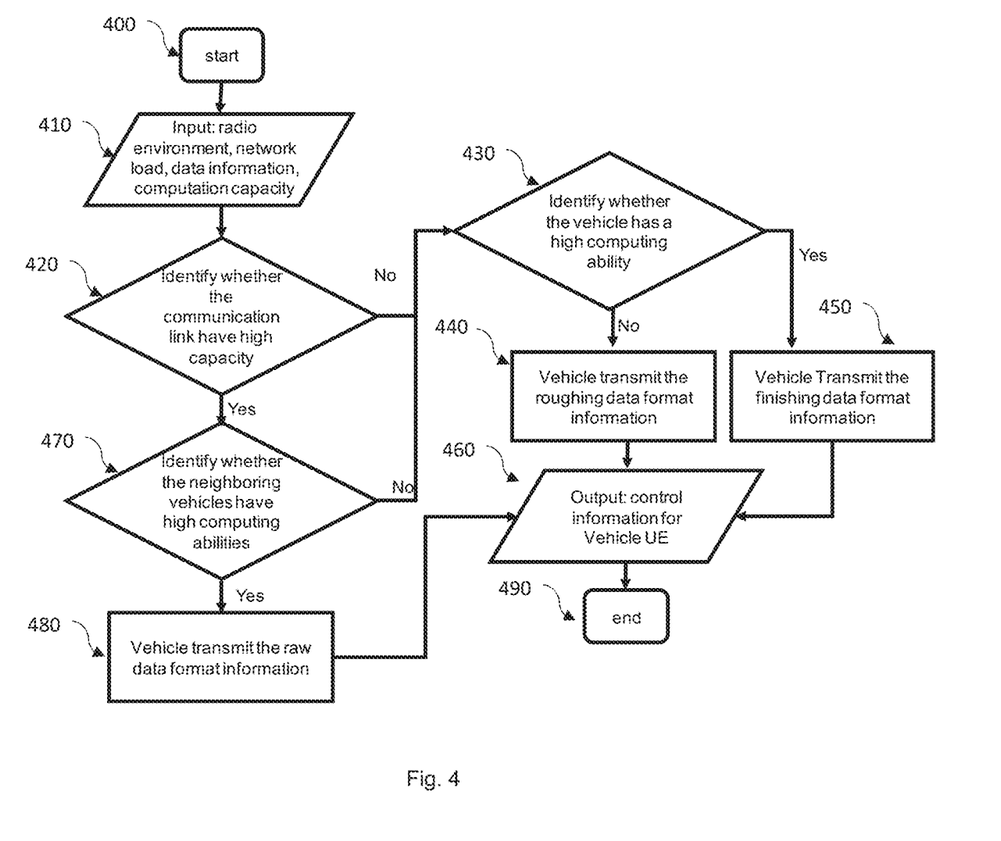
FIG. 4 shows a flowchart of a further exemplary implementation of a control algorithm for determining the data format for data to be sent.

FIG. 4 shows a flowchart of a further exemplary implementation of a control algorithm for determining the data format for data to be sent. The control algorithm shown FIG. 4 is similar to the on depicted in FIG. 3 but considers also the neighboring vehicle's computation capacities.

At step 400 the algorithm starts, which may include setting up communication elements or sensors and the like. At step 410 information regarding communication capacity and computation capacity is received. This information can be received or be demanded from the at least vehicle and/or of the at least one device. Further information may originate from a radio network, the V2X network or the like and may include information on the radio environment and network load. Even further information may include information on the data or use cases for which the data is needed and/or during which the data was created.

At step 420, it is identified whether the V2X communication link has a high communication capacity. Here, static information may be used indicating the theoretical bandwidth of the V2X communication link. However, dynamic information indicating the actual bandwidth of the V2X communication link may provide information that is more precise.

For a V2X communication link having no high communication capacity, the algorithm branches to step 430. In step 430, it is identified whether the vehicle has a high computation capacity. The expression vehicle means the vehicle from which the data is to be sent.

In case the vehicle has a high computation capacity, the algorithm branches to step 440. In step 440, the finishing data format is chosen to be used for sending data by the vehicle. In case the vehicle has no high computation capacity, the algorithm branches to step 450. In step 450, the roughing data format is chosen to be used for sending data by the vehicle.

At step 460, a control information or an indication of the data format to be used is outputted to the vehicle or the UE of the vehicle.

If in step 420 is decided that the V2X communication link has high communication capacity, the algorithm branches to step 470. In step 470 is identified whether one or more neighboring vehicles have high computation capacities or abilities.

If in step 420 is decided that neighboring vehicles have no high computation abilities, the algorithm branches to step 430. As described above, in step 430 is identified whether the vehicle has a high computation capacity.

If in step 420 is decided that neighboring vehicles have high computation abilities, the algorithm branches to step 480. In step 480, the raw data format is chosen to be used for sending data by the vehicle. After running step 480, step 460 is executed as described above.

The control algorithm ends in step 480 and may start again for the next data transmission or the next communication for the same data to another vehicle and/or device.

Other alternative implementations of the control algorithm may consider also the delay requirements of the considered use case, e.g. if low delay is required, less processing of the data may be preferred.

Figure 5:
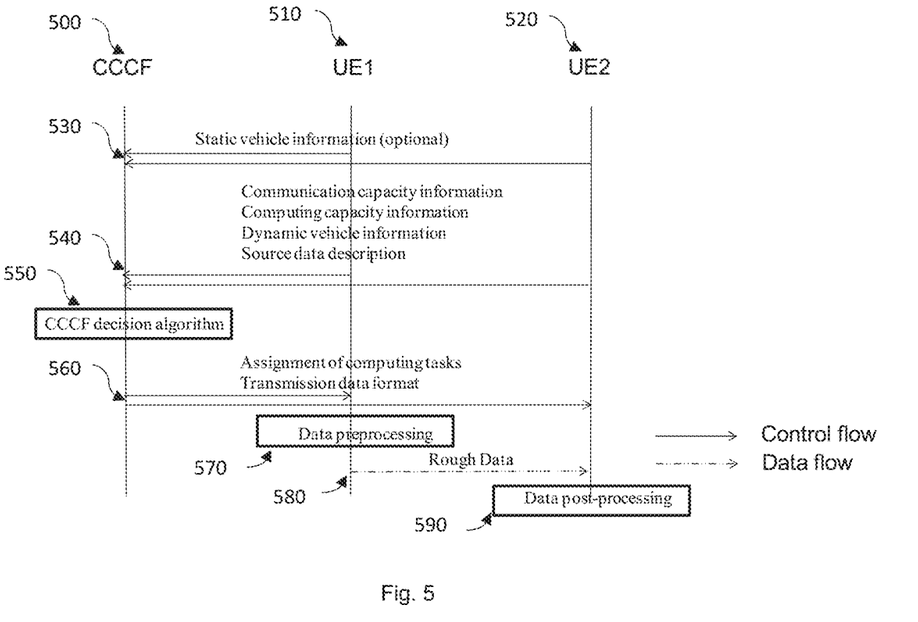
FIG. 5 shows a sequence diagram depicting a sequence of control and data transmission for vehicular UEs.

FIG. 5 shows a sequence diagram showing a sequence of control and data transmission for vehicular UEs. The control device or CCCF (Communication Computing Control Function) 500 communicates with a first UE1 510 and a second UE2 520. The user equipments (UE) 510 and 520 are integrated in other vehicles.

At 530, static vehicle information from UE1 510 and UE2 520 is optionally received at CCCF 500. Such static information includes for example the capability of board computing of the vehicle and can be acquired from a vehicle application server.

At 540, further information from UE1 510 and UE2 520 is received at CCCF 500. Such further information includes for example communication capacity information such as radio link information, e.g. link quality, and can be acquired from the communication network, e.g. a base station or the like. Further, computation capacity information like a current computing capacity or the load of the vehicle board computer may be transmitted. Dynamic vehicle information like the current speed, the position etc. and source data description of the vehicle for example the type and volume of data may further be transmitted from one or both UEs 510 and 520 to the CCCF 500.

At 550, the CCCF 500 runs the decision or control algorithm as described above. At 560, the CCCF assigns processing tasks and the data transmission types to the vehicular UEs 510 and 520. The assignment of computing or vice versa the data transmission type may be inherently deducted from the UE 510 or 520 from the other information. For example, intensive computing or processing tasks may be related to an indication of the finishing data format. Here, an assignment of preprocessing data and sending rough data to UE2 520 is sent to UE1 510. UE2 receives an assignment of post-processing data received from UE 1.

At 570, UE1 510 accordingly executes data preprocessing on the source data and at 580, sends rough data, i.e. data in the roughing format, to UE2 520.

At 590, UE2 520 post-processes the data. Hence, the crew members UE1 510 and UE2 520 use the fog resources to complete their transmission task following the CCCF decision.

Figure 6:
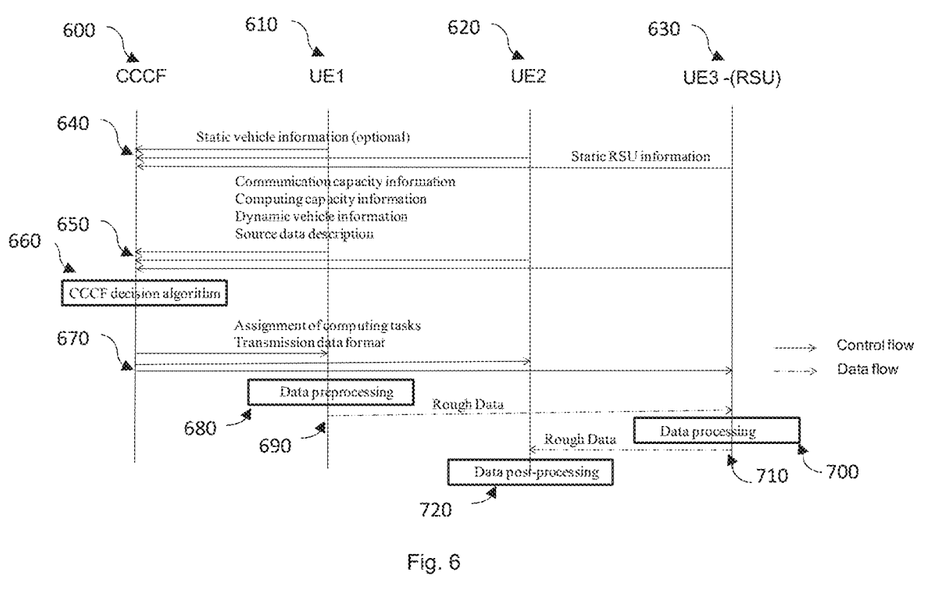
FIG. 6 shows a sequence diagram depicting a sequence of control and data transmission for vehicular UEs and RSUs.

FIG. 6 shows a sequence diagram showing a sequence of control and data transmission for vehicular UEs and RSUs. The control device or CCCF (Communication Computing Control Function) 600 communicates with a first UE1 610, a second UE2 620 and a third UE3 630. The user equipments (UE) 610 and 620 are integrated in other vehicles while the third UE3 630 is integrated in an RSU.

At 640, static vehicle information from UE1 610 and UE2 620 is optionally received at CCCF 500. Further static information is received from the RSU. Such static information includes for example the capability of computing of the vehicle/RSU and can be acquired from a vehicle application server or from the RSU.

At 650, further information from UE1 610 and UE2 620 is received at CCCF 600. Such further information includes for example communication capacity information such as radio link information, e.g. link quality, and can be acquired from the communication network, e.g. a base station or the like. Further, computation capacity information like a current computing capacity or the load of the vehicle board computer may be transmitted. Dynamic vehicle information like the current speed, the position etc. and source data description of the vehicle for example the type and volume of data may further be transmitted from one or more of the UEs 610, 620 and 630 to the CCCF 600.

At 660, the CCCF 600 runs the decision or control algorithm as described above. At 670, the CCCF 600 assigns processing tasks and the data transmission types to the vehicular UEs 610 and 620 and the RSU UE 630. The assignment of computing or vice versa the data transmission type may be inherently deducted from the UE 610, 620 or 630 from the other information. For example, intensive computing or processing tasks may be related to an indication of the finishing data format.

Here, an assignment of preprocessing data and sending rough data to UE3 630 is sent to UE1 610. UE2 620 receives an assignment of post-processing rough data received from UE3 630. UE3 630 receives an assignment of processing rough data received from UE1 610 and sending rough data to UE2 620. Note that in this example the UE1 and the RSU send rough data and UE 3 has still to process the data. This implies that several levels of the rough data format exist.

At 680, UE1 610 accordingly executes data preprocessing on the source data and at 690, sends rough data, i.e. data in the roughing format, to UE3 630.

At 700, UE3 630 processes the data and at 710, sends rough data, i.e. data in the roughing format, to UE2 620.

At 720, UE2 620 post-processes the data and completes the task, which was portioned by the CCCF 600.

In this example, the header of the platoon, for example the vehicle of UE1 610, may carry out the CCCF algorithm 660 to make the decision. The decision outcomes assign to each crew member and RSUs computing/transmission tasks to guide the cooperation. Hence, the crew members UE1 610 and UE2 620 and RSU UE3 630 use the fog resources or their own resource complete their computing/transmission task following the order of the header.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A control device configured to determine a data format for data to be sent via a V2X communication link between a vehicle and at least one device, the control device comprising:
    a processor; and
    a memory storing instructions for execution by the processor,
    wherein the processor is configured to execute the instructions for:
        receiving information regarding communication capacity and computation capacity of the vehicle or of the at least one device,
        analyzing the received information based on the communication capacity of the vehicle or of the at least one device,
        selecting, based on results of the analyzing, a data format from a set of data formats for the V2X communication link, and
        sending to the vehicle or the at least one device, an indication of the data format to be used for the data to be sent, wherein
        the computation capacity of the vehicle or of the at least one device includes an indicator comprising a self-descriptive parameter indicative of a calculation ability of the vehicle or of the at least one device, and
        the data formats of the set of data formats are differentiated with regard to a data volume of the data to be sent,
        wherein the indicator corresponds to one or both of a processing core speed or a number of processing cores.

2. The control device according to claim 1, wherein the processor is further configured to send a message including the indication of the data format and an assignment of computing tasks to be performed on the data to be sent before sending the data, or a message including the indication of the data format, an assignment of computing tasks and a receiver, to the vehicle or the at least one device.

3. The control device according to claim 1, wherein the processor is further configured to provide at least three data formats comprising at least one of a raw data format, a roughing data format, or a finishing data format, wherein the raw data format is uncomputed, the roughing data format is partially computed, and the finishing data format is completely computed.

4. The control device according to claim 1, wherein the information regarding communication capacity includes the communication capacity of the vehicle or the at least one device and the communication capacity of the V2X communication link.

5. The control device according to claim 1, wherein the information regarding computation capacity includes a current computing capacity, actual computing tasks or a static computing capacity.

6. The control device according to claim 1, wherein the control device is further configured to receive and analyze static vehicle information, dynamic vehicle information, static device information, dynamic device information, source data description or a use case related to the data.

7. The control device according to claim 1, wherein the control device is further configured to indirectly receive the information regarding communication capacity and computation capacity of the vehicle or of the at least one device from a representative of the vehicle or of the at least one device.

8. The control device according to claim 1, wherein the control device is further configured to be implemented in a vehicle, a device, an element of a V2X communication network providing the V2X communication link or a service provider.

9. A control device comprising:
a processor; and
a memory configured to store instructions capable of being executed by the processor, wherein the processor and the instructions are configured to:
receive information comprising:
a first indicator of a communication capacity of a vehicle, wherein the communication capacity corresponds to a V2X communication link; and
a second indicator comprising a self-descriptive parameter indicative of a calculation ability of the vehicle,
select, based on the first and second indicators, a data format from a set of data formats, and
send an indication of the data format to the vehicle,
wherein the data formats of the set of data formats correspond to differentiated data volumes of data sent by the vehicle over the V2X communication link, and
wherein the second indicator corresponds to one or both of a processing core speed or a number of processing cores.

10. The control device according to claim 9, wherein the first indicator corresponds to one or both of a bandwidth or throughput parameter.

11. The control device according to claim 9, wherein the set of data formats comprises:
a first data format corresponding to non-computed data;
a second data format corresponding to moderately computed data; and
a third data format corresponding to extensively computed data.

12. The control device according to claim 11, wherein the processor and the instructions are configured to:
send the indication of the data format being the first data format responsive to the first indicator corresponding to a first communication capacity level; and
send the indication of the data format being the second or third data format responsive to the first indicator corresponding to a second communication capacity level below the first communication capacity level.

13. The control device according to claim 12, wherein the processor and the instructions are configured to:
send the indication of the data format being the second data format responsive to the second indicator corresponding to a first computation capability level; and
send the indication of the data format being the third data format responsive to the second indicator corresponding to a second computation capability level greater than the first computation capability level.

14. The control device according to claim 9, wherein the processor and the instructions are configured to send a message to the vehicle, wherein the message comprises:
an assignment of computing tasks corresponding to the data format selected from the set of data formats; and
the indication of the data format.

15. The control device according to claim 14, wherein the processor and the instructions are configured to send some or all of the message to a device configured to receive a communication from the vehicle over the V2X communication link.

16. A control device comprising:
a processor; and
a memory configured to store instructions capable of being executed by the processor,
wherein the processor and the instructions are configured to:
receive information from a plurality of vehicles, wherein the information from each vehicle of the plurality of vehicles comprises:
a first indicator of a capacity of the vehicle to communicate over a V2X communication link; and
a second indicator comprising a self-descriptive parameter indicative of a calculation ability of the vehicle, and
for each vehicle of the plurality of vehicles, select a data format from a set of data formats, and send an indication of the data format to the vehicle,
wherein
the data formats of the set of data formats correspond to differentiated data volumes of data sent by the vehicle over the V2X communication link,
the second indicator corresponds to one or both of a processing core speed or a number of processing cores, and
selecting the data format from the set of data formats is based on the first and second indicators received from each vehicle of the plurality of vehicles.

17. The control device according to claim 16, wherein
the first indicator has a dynamic value corresponding to one or both of an available bandwidth or an available throughput, and/or
the second indicator has a dynamic value corresponding to one or both of the available processing core speed or the number of available processing cores.

18. The control device according to claim 16, wherein the set of data formats comprises:
a first data format corresponding to non-computed data;
a second data format corresponding to moderately computed data; and
a third data format corresponding to extensively computed data.

19. The control device according to claim 18, wherein the processor and the instructions are configured to:
for a vehicle of the plurality of vehicles, send the indication of the data format being the first data format corresponding to the vehicle communicating to one or more cloud servers over the V2X communication link.

* * * * *